US011774701B2

United States Patent
Wu et al.

(10) Patent No.: US 11,774,701 B2
(45) Date of Patent: Oct. 3, 2023

(54) VOICE COIL MOTOR

(71) Applicant: Lanto Electronic Limited, Kunshan (CN)

(72) Inventors: Fuyuan Wu, Kunshan (CN); Yaobang Guo, Kunshan (CN); Shengwen Sun, Kunshan (CN); Bingbing Ma, Kunshan (CN); Jie Du, Kunshan (CN); Shangyu Hsu, Kunshan (CN)

(73) Assignee: Lanto Electronic Limited, Kunshan (CN)

( * ) Notice: Subject to any disclaimer, the term of this patent is extended or adjusted under 35 U.S.C. 154(b) by 258 days.

(21) Appl. No.: 17/337,960

(22) Filed: Jun. 3, 2021

(65) Prior Publication Data

US 2021/0382262 A1      Dec. 9, 2021

(30) Foreign Application Priority Data

Jun. 8, 2020   (CN) .......................... 202010512306.0

(51) Int. Cl.
    *G02B 7/04*        (2021.01)
    *G03B 5/02*        (2021.01)
    (Continued)

(52) U.S. Cl.
    CPC ................. *G02B 7/04* (2013.01); *G03B 5/02* (2013.01); *G03B 13/34* (2013.01);
    (Continued)

(58) Field of Classification Search
    CPC ... G02B 7/00; G02B 7/02; G02B 7/04; G03B 5/00; G03B 5/02; G03B 13/32;
    (Continued)

(56) References Cited

U.S. PATENT DOCUMENTS

| | | | |
|---|---|---|---|
| 2002/0067556 A1 | 6/2002 | Miyakawa | |
| 2004/0189130 A1* | 9/2004 | Hovanky | ............... H02K 23/54 310/156.32 |

(Continued)

FOREIGN PATENT DOCUMENTS

| | | |
|---|---|---|
| CN | 201133958 Y | 10/2008 |
| CN | 101515054 A | 8/2009 |

(Continued)

OTHER PUBLICATIONS

First Office Action issued in Chinese Application No. 202010512306.0, dated May 19, 2021.

(Continued)

*Primary Examiner* — William R Alexander
(74) *Attorney, Agent, or Firm* — Birch, Stewart, Kolasch & Birch, LLP

(57) ABSTRACT

Provided is a voice coil motor including a housing assembly, a base assembly, a zoom lens holder, a first electromagnetic drive assembly, a focusing lens holder and a second electromagnetic drive assembly. The zoom lens holder and the focusing lens holder are disposed in an accommodation space formed by the housing assembly and the base assembly. The first electromagnetic drive assembly is configured to drive the zoom lens holder to move in a front-back direction and includes a first magnetic steel portion and a first coil disposed opposite to the first magnetic steel portion. The second electromagnetic drive assembly is configured to drive the focusing lens holder to move in the front-back direction and includes a second magnetic steel portion and a second coil disposed opposite to the second magnetic steel portion.

20 Claims, 12 Drawing Sheets

(51) Int. Cl.
*G03B 13/34* (2021.01)
*H02K 41/035* (2006.01)

(52) U.S. Cl.
CPC . *H02K 41/0356* (2013.01); *G03B 2205/0046* (2013.01); *G03B 2205/0069* (2013.01)

(58) Field of Classification Search
CPC ............ G03B 13/34; G03B 2205/0046; G03B 2205/0069; H02K 41/0354; H02K 41/0356
USPC .......................................................... 359/824
See application file for complete search history.

(56) References Cited

U.S. PATENT DOCUMENTS

| | | | | |
|---|---|---|---|---|
| 2006/0228099 | A1* | 10/2006 | Chiang | G02B 13/001 396/133 |
| 2007/0268595 | A1* | 11/2007 | Ho | G02B 7/102 359/694 |
| 2009/0268309 | A1* | 10/2009 | Ke | G02B 7/08 359/698 |
| 2019/0196137 | A1* | 6/2019 | Ushioda | G02B 27/646 |

FOREIGN PATENT DOCUMENTS

| | | |
|---|---|---|
| CN | 101551506 A | 10/2009 |
| CN | 101566714 A | 10/2009 |
| CN | 101881873 A | 11/2010 |
| CN | 102162898 A | 8/2011 |
| CN | 202502330 U | 10/2012 |
| CN | 202870372 U | 4/2013 |
| CN | 105511047 A | 4/2016 |
| CN | 105700107 A | 6/2016 |
| CN | 107966868 A | 4/2018 |
| CN | 109581617 A | 4/2019 |
| CN | 110261987 A | 9/2019 |
| CN | 106597630 B | 1/2020 |
| CN | 110646913 A | 1/2020 |
| CN | 111061029 A | 4/2020 |
| CN | 111158103 A | 5/2020 |
| CN | 210488101 U | 5/2020 |
| KR | 10-2018-0012150 A | 2/2018 |

OTHER PUBLICATIONS

Search Report issued in Chinese Application No. 202010512306.0, dated Jun. 8, 2020.

* cited by examiner

VOICE COIL MOTOR

CROSS-REFERENCE TO RELATED APPLICATION

This application claims priority to Chinese Patent Application No. 202010512306.0 filed Jun. 8, 2020, the disclosure of which is incorporated herein by reference in its entirety.

TECHNICAL FIELD

The present disclosure relates to the field of camera technologies of electronic products and, in particular, to a voice coil motor.

BACKGROUND

A camera module of an electronic product generally includes a focusing unit and a zoom unit disposed in a housing, where the zoom unit is used for focusing the camera module and the zoom unit is used for zooming the camera module.

In the related art, the zoom unit includes a holder, and a first lens and a second lens which are both fixed to the holder, where the first lens has an amplification function, and the second lens is a common lens with no amplification function. When a zoom function needs to be achieved through the zoom unit, the zoom function is generally achieved by using the first lens and the second lens through calculation and analysis of a specific software.

Since when the zoom function is used, an image displayed in the camera module cannot be directly enlarged or reduced and the calculation and analysis of the software is needed, the zoom function of the camera module consumes more time, thereby causing a jamming phenomenon when the camera module is applied in zoom and affecting a normal use of the electronic product.

SUMMARY

The present disclosure provides a voice coil motor, which can reduce time consumption in a zoom process, thereby preventing a jamming phenomenon in the zoom process and enabling a normal use of an electronic product.

As conceived as above, the present disclosure provides technical solutions described below.

A voice coil motor includes a housing assembly, a base assembly, a zoom lens holder, a first electromagnetic drive assembly, a focusing lens holder and a second electromagnetic drive assembly.

The base assembly forms an accommodation space with the housing assembly.

The zoom lens holder is disposed in the accommodation space.

The first electromagnetic drive assembly includes a first magnetic steel portion and a first coil disposed opposite to the first magnetic steel portion, where one of the first magnetic steel portion or the first coil is disposed on the housing assembly or the base assembly, and the other one of the first magnetic steel portion or the first coil is disposed on the zoom lens holder.

The focusing lens holder and the zoom lens holder are disposed in the accommodation space in a front-back direction.

The second electromagnetic drive assembly includes a second magnetic steel portion and a second coil disposed opposite to the second magnetic steel portion, where one of the second magnetic steel portion and the second coil is disposed on the housing assembly or the base assembly, and the other one of the second magnetic steel portion or the second coil is disposed on the focusing lens holder.

The first electromagnetic drive assembly and the second electromagnetic drive assembly are independent of each other, the first electromagnetic drive assembly is configured to drive the zoom lens holder to move in the front-back direction, and the second electromagnetic drive assembly is configured to drive the focusing lens holder to move in the front-back direction.

Optionally, each of the first magnetic steel portion and the second magnetic steel portion has an N pole and an S pole, the N pole and the S pole of the first magnetic steel portion are alternate in the front-back direction, and the N pole and S pole of the second magnetic steel portion are alternate in the front-back direction.

Optionally, the voice coil motor further includes a coil mounting plate, where the coil mounting plate is fixed on the housing assembly or the base assembly, and both the first coil and the second coil are disposed on the coil mounting plate.

Optionally, the voice coil motor further includes a plurality of rolling assemblies, where the voice coil motor comprises at least one of following structures: the zoom lens holder is provided with a first groove, one of the base assembly or the housing assembly is provided with a second groove corresponding to the first groove, one of the plurality of rolling assemblies is rollably disposed in a space formed by the first groove and the second groove, and by the one of the plurality of rolling assemblies, the zoom lens holder is moved along the front-back direction relative to the one of the base assembly or the housing assembly; or the focusing lens holder is provided with a third groove, one of the base assembly or the housing assembly is provided with a fourth groove corresponding to the third groove, another one of the plurality of rolling assemblies is rollably disposed in a space formed by the third groove and the fourth groove, and by the another one of the plurality of rolling assemblies, the focusing lens holder is moved along the front-back direction relative to the one of the base assembly or the housing assembly.

Optionally, the first groove is disposed on a bottom side of the zoom lens holder, the third groove is disposed on a bottom side of the focusing lens holder, the second groove and the fourth groove are both disposed on the base assembly, and the first groove, the second groove, the third groove and the fourth groove are arranged as one of a V-shaped groove or a U-shaped groove.

Optionally, each of the plurality of rolling assemblies includes two first balls and one second ball disposed between the two first balls, and a volume of the one second ball is smaller than a volume of each of the two first balls.

Optionally, the zoom lens holder includes a first portion and two second portions disposed at two ends of the first portion, a length of each of the two second portions in the front-back direction is greater than a length of the first portion in the front-back direction, and the first groove is disposed at each of the two second portions.

Optionally, the voice coil motor further includes an adsorption member embedded in the base assembly, where the adsorption member and at least one of the first electromagnetic drive assembly or the second electromagnetic drive assembly have a magnetic attraction force with each other.

The voice coil motor further includes a support frame and a third ball, where the support frame is sleeved outside the zoom lens holder and the focusing lens holder, corner positions of at least one of the zoom lens holder or the focusing lens holder are provided with grooves, and the third ball is rollably disposed between a respective groove and the support frame.

Optionally, the voice coil motor further includes a first ball holding mechanism, a second ball holding mechanism and a fourth ball, where an end of the first ball holding mechanism is connected to the housing assembly or the base assembly, and the other end of the first ball holding mechanism has a first arc groove; an end of the second ball holding mechanism is connected to the zoom lens holder and/or the focusing lens holder, and the other end of the second ball holding mechanism has a second arc groove; and the fourth ball is rollably disposed in a space formed by the first arc groove and the second arc groove.

DETAILED DESCRIPTION

Figure 1:
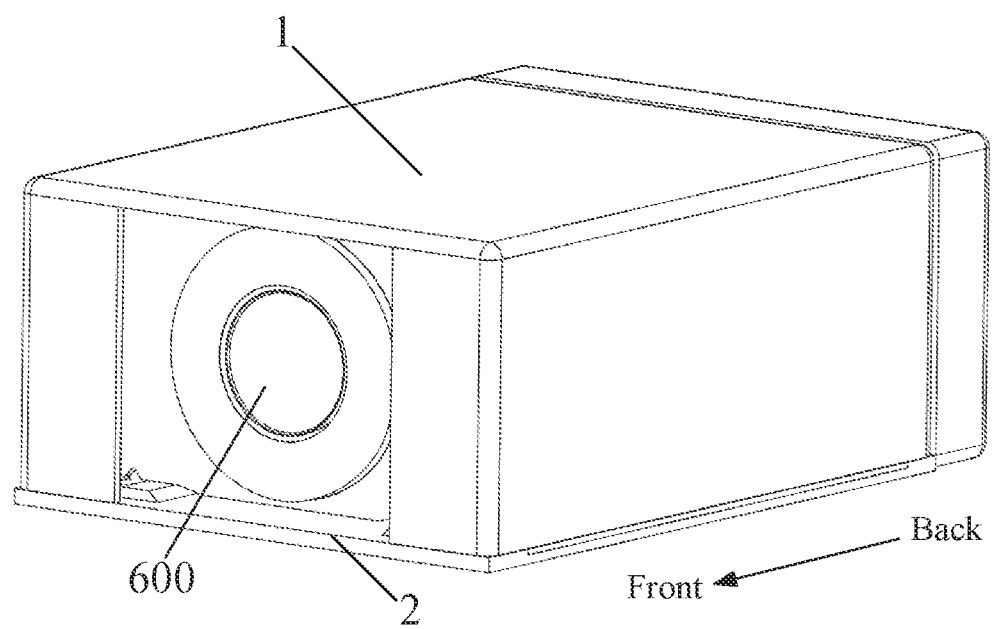
FIG. 1 is a structure view of a voice coil motor according to an embodiment of the present disclosure.

The solution of the present disclosure is further described in conjunction with accompanying drawings and an embodiment. It is to be understood that the specific embodiments set forth below are intended to illustrate and not to limit the present disclosure.

In the description of the present disclosure, it is to be noted that the orientational or positional relationships indicated by terms "center", "above", "below", "left", "right", "vertical", "horizontal", "inside", "outside" and the like are based on the orientational or positional relationships illustrated in the drawings, which are for the mere purpose of facilitating and simplifying the description of the present disclosure, and these relationships do not indicate or imply that the device or component referred to has a specific orientation and is constructed and operated in a specific orientation, and thus it is not to be construed as limiting the present disclosure. Moreover, terms like "first" and "second" are merely used for the description and are not to be construed as indicating or implying relative importance.

In the description of the present disclosure, it should be noted that unless otherwise expressly specified and limited, terms like "mounted", "connected to each other", "connected" are to be construed in a broad sense, for example, as permanently connected, detachably connected; mechanically connected or electrically connected; directly connected or indirectly connected via an intermediate medium; or internally connected between two elements. For those of ordinary skill in the art, the above terms can be construed according to specific circumstances in the present disclosure.

This embodiment provides a voice coil motor, which is applied to a camera module including a zoom lens 600 and a focusing lens 700 and can directly drive the zoom lens 600, so that a jamming phenomenon is not easy to occur.

Figure 2:
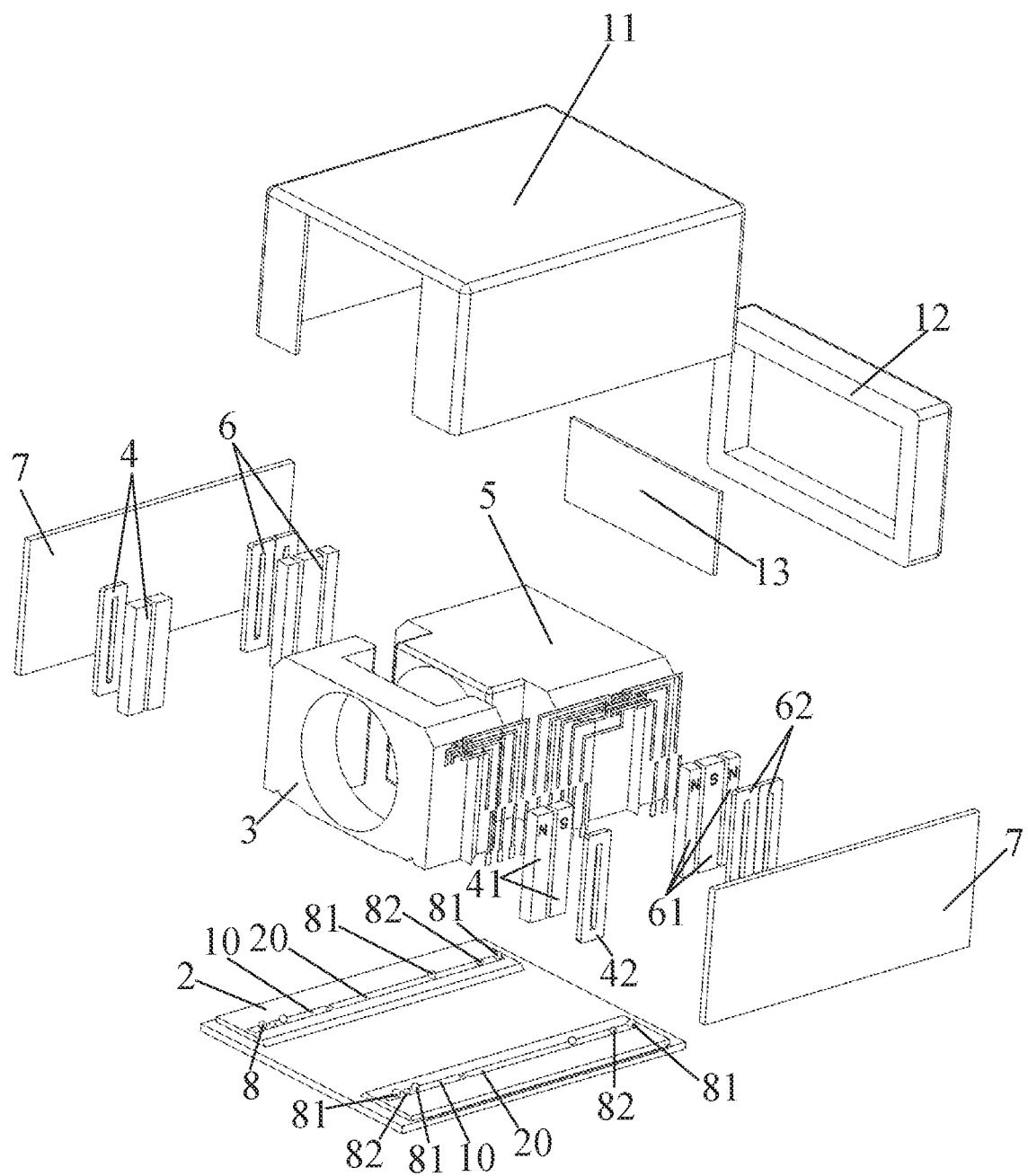
FIG. 2 is an exploded structure view one of a voice coil motor according to an embodiment of the present disclosure.

As shown in FIG. 1 to FIG. 12, the voice coil motor includes a housing assembly 1, a base assembly 2 capable of forming an accommodation space with the housing assembly 1, a zoom lens holder 3 disposed in the accommodation space, a first electromagnetic drive assembly 4 for driving the zoom lens holder 3 to move in a front-back direction, a focusing lens holder 5 disposed in the accommodation space with the zoom lens holder 3 in the front-back direction, and a second electromagnetic drive assembly 6 for driving the focusing lens holder 5 to move in the front-back direction. The first electromagnetic drive assembly 4 and the second electromagnetic drive assembly 6 can operate independently of each other, that is, the first electromagnetic drive assembly 4 and the second electromagnetic drive assembly 6 do not interfere and influence each other. The front-back direction in this embodiment is shown in FIG. 1, specifically, the front-back direction is a direction in which one end of the housing assembly 1 points to the other end, or the front-back direction is a focusing direction of the focusing lens 700. Optionally, the zoom lens holder 3 may be disposed in front of the focusing lens holder 5 (as shown in FIG. 2), or the focusing lens holder 5 may be disposed in front of the zoom lens holder 3.

As shown in FIG. 2, the first electromagnetic drive assembly 4 includes a first magnetic steel portion 41 and a first coil 42 disposed opposite to the first magnetic steel portion 41. Additionally, one of the first magnetic steel portion 41 or the first coil 42 is disposed on the housing assembly 1 or the base assembly 2, and the other one of the first magnetic steel portion 41 or the first coil 42 is disposed on the zoom lens holder 3. A magnetic driving force generated by an interaction between the first magnetic steel portion 41 and the first coil 42 can drive the zoom lens holder 3 to move in the front-back direction so that a zoom lens 600 disposed on the zoom lens holder 3 can achieve zooming. It is to be noted that all following content in this embodiment is described with an example of an assembly that the first magnetic steel portion 41 is disposed on the zoom lens holder 3 and the first coil 42 is disposed on the base assembly 2, and other assembly modes of the first magnetic steel portion 41 and the first coil 42 may refer to this assembly mode.

Still referring to FIG. 2, the second electromagnetic drive assembly 6 includes a second magnetic steel portion 61 and a second coil 62 disposed opposite to the second magnetic steel portion 61. Additionally, one of the second magnetic steel portion 61 or the second coil 62 is disposed on the housing assembly 1 or the base assembly 2, and the other one of the second magnetic steel portion 61 or the second coil 62 is disposed on the focusing lens holder 5. A magnetic driving force generated by an interaction between the second magnetic steel portion 61 and the second coil 62 can drive the focusing lens holder 5 to move in the front-back direction so that a focusing lens 700 disposed on the focusing lens holder 5 can achieve focusing. It is to be noted that all following content in this embodiment is described with an example of an assembly that the second magnetic steel portion 61 is disposed on the focusing lens holder 5 and the second coil 62 is disposed on the base assembly 2, and other assembly modes of the second magnetic steel portion 61 and the second coil 62 may refer to this assembly mode.

In the voice coil motor provided by this embodiment, the first electromagnetic drive assembly 4 is provided such that the zoom lens holder 3 can be moved under the drive of the first electromagnetic drive assembly 4. Specifically, when zooming is required, only a current need to be supplied to the first coil 42 to enable that the first coil 42 interacts with the first magnetic steel portion 41 and then the first coil 42 or the first magnetic steel portion 41 drives the zoom lens holder 3 to move in the front-back direction, so that the zooming of the zoom lens 600 can be achieved, achievement of the zoom function is optimized from a software drive in the related art to a mechanical drive in this embodiment, time consumption in a zoom process is reduced, the jamming phenomenon in the zoom process is prevented, and the electronic product can be normally used.

In addition, the voice coil motor provided by this embodiment can provide a driving force to both the zoom lens holder 3 and the focusing lens holder 5 so that the zooming of the zoom lens 600 is achieved and then the focusing of the focusing lens 700 is also achieved, thus improving performance of the voice coil motor.

Optionally, each of the first magnetic steel portion 41 and the second magnetic steel portion 61 has an N pole and an S pole, the N pole and the S pole of the first magnetic steel portion 41 are alternate in the front-back direction, and the N pole and S pole of the second magnetic steel portion 61 are alternate in the front-back direction. The first magnetic steel portion 41 may have one or more N poles, and may also have one or more S poles, and in a case where the first magnetic steel portion 41 has a plurality of N poles and a plurality of S poles, the plurality of N poles and the plurality of S poles are staggered. Exemplarily, a staggered arrangement may be that a first portion of the first magnetic steel portion 41 is an N pole, a second portion is an S pole, a third portion is an N pole, a fourth portion is an S pole, and so on. Similarly, the second magnetic steel portion 61 may have one or more N poles, and may also have one or more S poles, and an arrangement of the N pole and the S pole of the second magnetic steel portion 61 may refer to the arrangement of the N pole and the S pole of the first magnetic steel portion 41.

Optionally, the first magnetic steel portion 41 may have various types of structures, and this embodiment provides a first magnetic steel portion 41 having the following two types of structures.

In one structure of the first magnetic steel portion 41, the first magnetic steel portion 41 is of a single block structure, and the first magnetic steel portion 41 has a plurality of regions in the front-back direction, and two adjacent regions of the plurality of regions are magnetized with different magnetic polarities.

Figure 3:
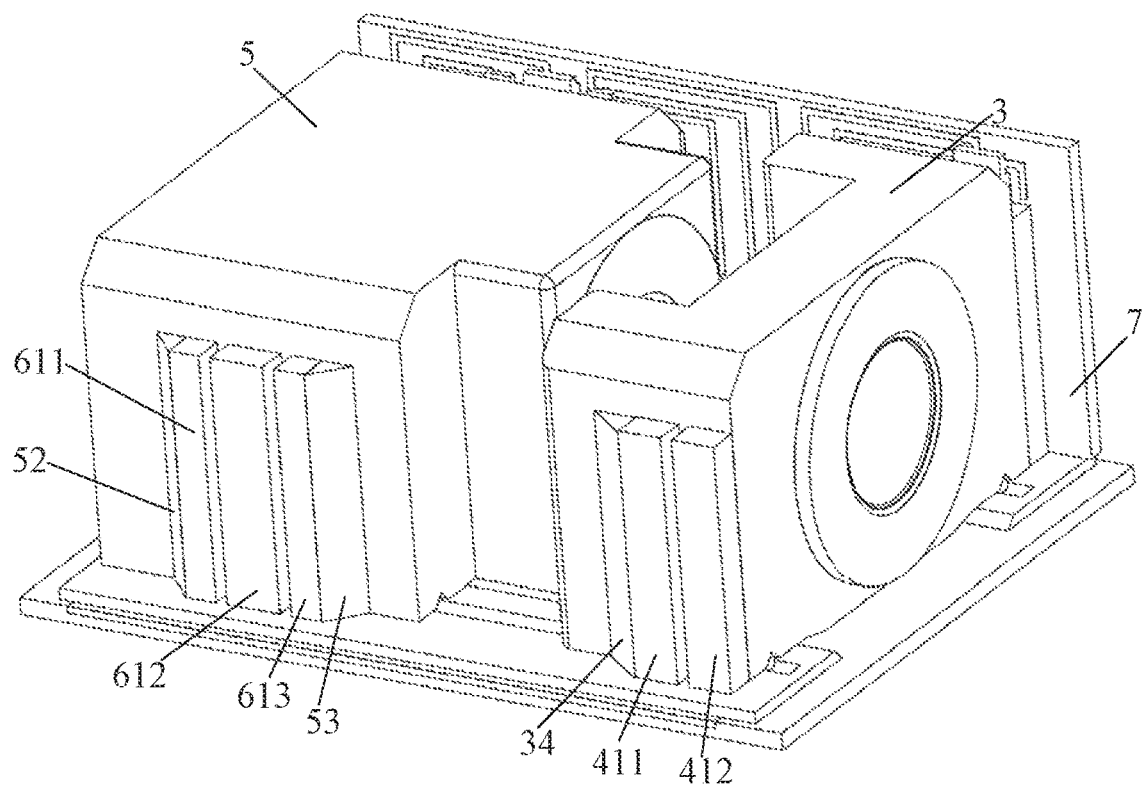
FIG. 3 is a structure view one of a partial voice coil motor according to an embodiment of the present disclosure.

In another structure of the first magnetic steel portion 41, the first magnetic steel portion 41 is of a split structure. Exemplarily, as shown in FIG. 3, the first magnetic steel portion 41 may include a first magnetic pole 411 and a second magnetic pole 412 spaced in the front-back direction, where the first magnetic pole 411 and the second magnetic pole 412 have opposite magnetic polarities, that is, one of the first magnetic pole 411 or the second magnetic pole 412 is an N pole and the other one of the first magnetic pole 411 or the second magnetic pole 412 is an S pole. Such arrangement of the first magnetic pole 411 and the second magnetic pole 412 enables the first electromagnetic drive assembly 4 to occupy a small space while generating a sufficient driving force, and enables an overall weight of the voice coil motor to be lighter. It is to be understood that the first magnetic steel portion 41 may include a plurality of first magnetic poles 411 and a plurality of second magnetic poles 412, and the plurality of first magnetic poles 411 and the plurality of second magnetic poles 412 are alternately arranged at intervals.

In this case, in order to ensure that the first electromagnetic drive assembly 4 generates a relatively stable driving force, a volume of the first magnetic pole 411 may be the same as a volume of the second magnetic pole 412. Optionally, the volume of the first magnetic pole 411 may also be different from the volume of the second magnetic pole 412, which is not limited in this embodiment. Exemplarily, as shown in FIG. 3, both the first magnetic pole 411 and the second magnetic pole 412 may be elongated and extend perpendicularly to the base assembly 2.

In response to the two structures of the first magnetic steel portion 41, the first electromagnetic drive assembly 4 may include one or more first coils 42, where each first coil 42 is capable of interacting with a pair of N and S poles on the first magnetic steel portion 41 to generate a driving force in the front-back direction. Exemplarily, as shown in FIG. 2, the first electromagnetic drive assembly 4 may include one first coil 42 disposed at left and right intervals with the first magnetic pole 411 and the second magnetic pole 412 arranged side by side, and the one first coil 42 can interact with the first magnetic pole 411 and the second magnetic pole 412 to generate an electromagnetic driving force in the front-back direction to drive the zoom lens holder 3 to move.

Similarly, the second magnetic steel portion 61 may have various types of structures, and this embodiment provides the second magnetic steel portion 61 having the following two types of structures.

In one structure of the second magnetic steel portion 61, the second magnetic steel portion 61 is of a single block structure, and the second magnetic steel portion 61 has a plurality of regions in the front-back direction, and two adjacent regions of the plurality of regions are magnetized with different magnetic polarities.

In another structure of the second magnetic steel portion 61, the second magnetic steel portion 61 is of a split structure, and as shown in FIG. 3, the second magnetic steel portion 61 includes a third magnetic pole 611, a fourth magnetic pole 612 and a fifth magnetic pole 613, which are successively spaced in the front-back direction, where magnetic polarities of the third magnetic pole 611 and the fourth magnetic pole 612 are opposite to each other, and the magnetic polarities of the third magnetic pole 611 and the fifth magnetic pole 613 are the same. Such arrangement of the third magnetic pole 611, the fourth magnetic pole 612 and the fifth magnetic pole 613 enables the second electromagnetic drive assembly 6 to generate a sufficient driving force.

In this case, in order to ensure that the second electromagnetic drive assembly 6 generates a relatively balanced driving force, a volume of the fourth magnetic pole 612 may be twice a volume of the third magnetic pole 611, and the volume of the third magnetic pole 611 is the same as a volume of the fifth magnetic pole 613. Exemplarily, as shown in FIG. 3, all the third magnetic pole 611, the fourth magnetic pole 612 and the fifth magnetic pole 613 may be elongated and extend perpendicularly to the base assembly 2.

In response to two structures of the second magnetic steel portion 61, the second electromagnetic drive assembly 6 may include one or more second coils 62, where each second coil 62 is capable of interacting with a pair of N and S poles on the second magnetic steel portion 61 to generate a driving force in the front-back direction. Exemplarily, as shown in FIG. 2, the second electromagnetic drive assembly 6 may include two second coils 62, one of the two second coils 62 is disposed corresponding to the third magnetic pole 611 and a portion of the fourth magnetic pole 612, such that the one of the two second coils 62 and the third magnetic pole 611 and the portion of the fourth magnetic pole 612 are capable of generating a driving force in the front-back direction; and the other one of the two second coils 62 is disposed corresponding to the other portion of the fourth magnetic pole 612 and the fifth magnetic pole 613, such that the other one of the two second coils 62 and the other portion of the fourth magnetic pole 612 and the fifth magnetic pole 613 can also generate a driving force in the front-back direction.

The above-mentioned two types of first magnetic steel portions 41 and two types of second magnetic steel portions 61 may be combined at will to form voice coil motors having different first electromagnetic drive assemblies 4 and second electromagnetic drive assemblies 6, and both the first magnetic steel portion 41 and the second magnetic steel portion 61 having the above-mentioned two structures can generate the sufficient driving force to drive the zoom lens 600 and the focusing lens 700.

Referring to FIG. 2, the voice coil motor may include two first electromagnetic drive assemblies 4 and two second electromagnetic drive assemblies 6, where the two first electromagnetic drive assemblies 4 are disposed at left and right sides of the zoom lens holder 3 respectively so as to be able to drive the zoom lens holder 3 more smoothly and prevent the zoom lens holder 3 from falling to one side; and the two second electromagnetic drive assemblies 6 are disposed on left and right sides of the focusing lens holder 5 respectively so as to be able to drive the focusing lens holder 5 more smoothly.

Figure 7:
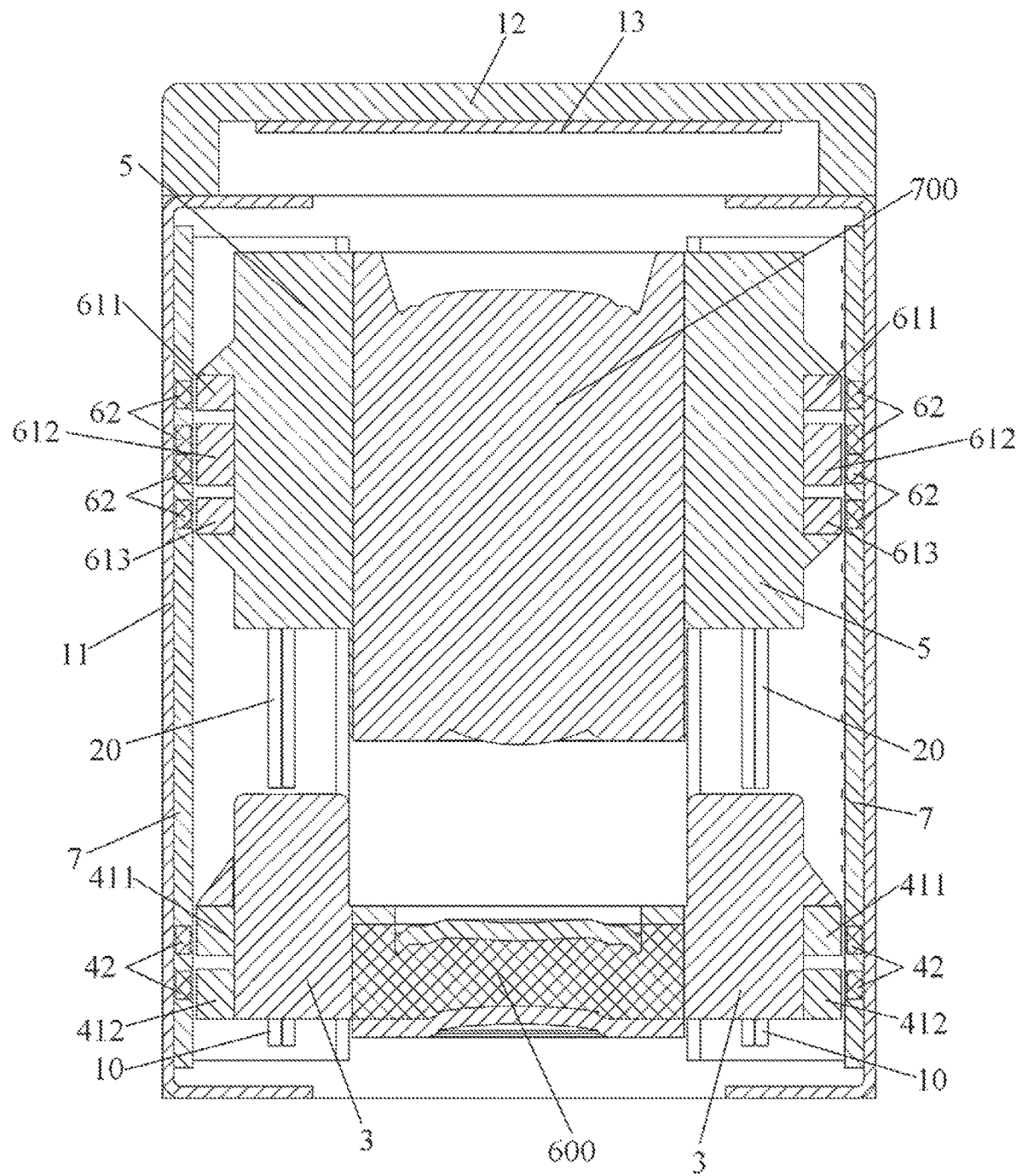
FIG. 7 is a cross-sectional view taken along a line A-A shown in FIG. 6 according to an embodiment of the present disclosure.
Figure 8:
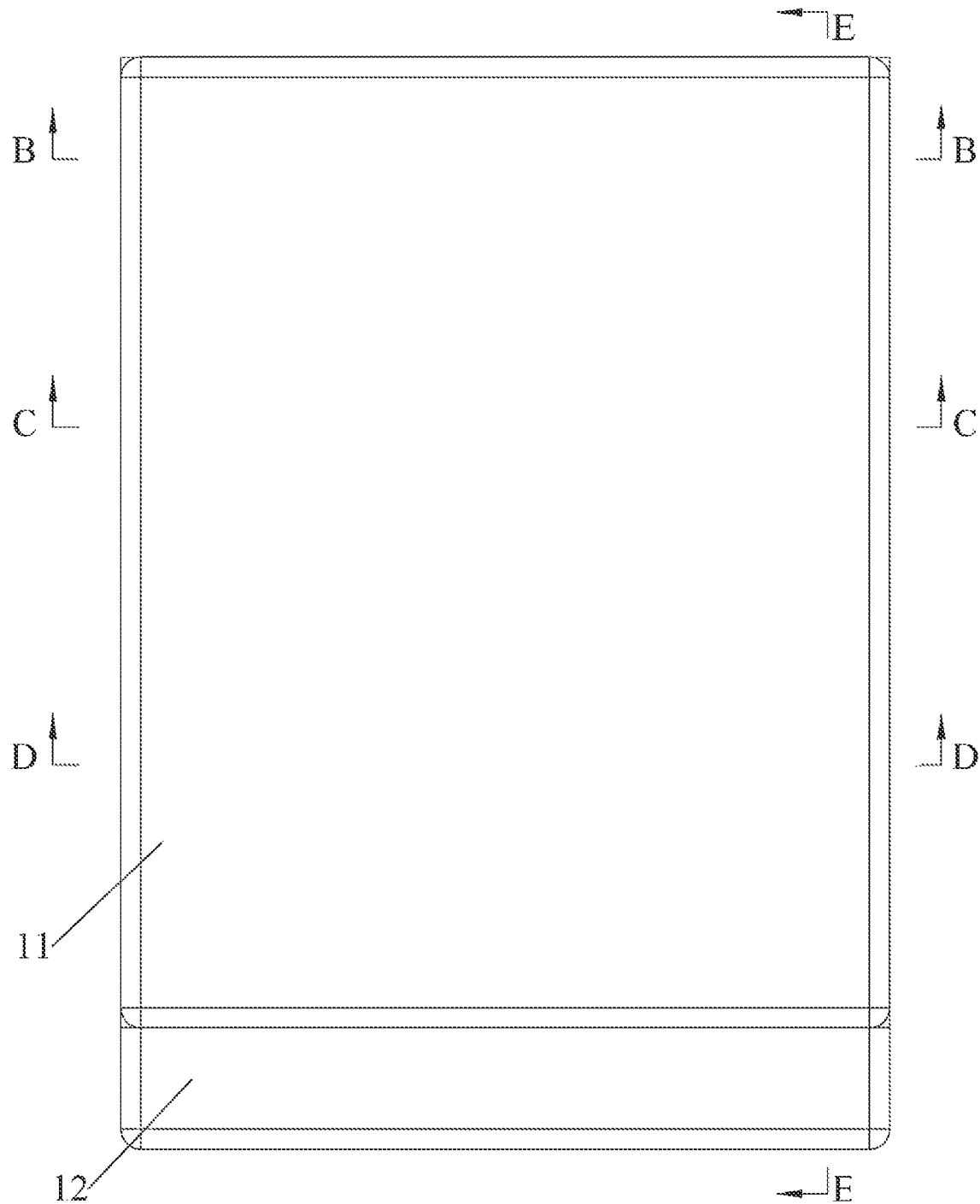
FIG. 8 is a top view of a voice coil motor according to an embodiment of the present disclosure.
Figure 10:
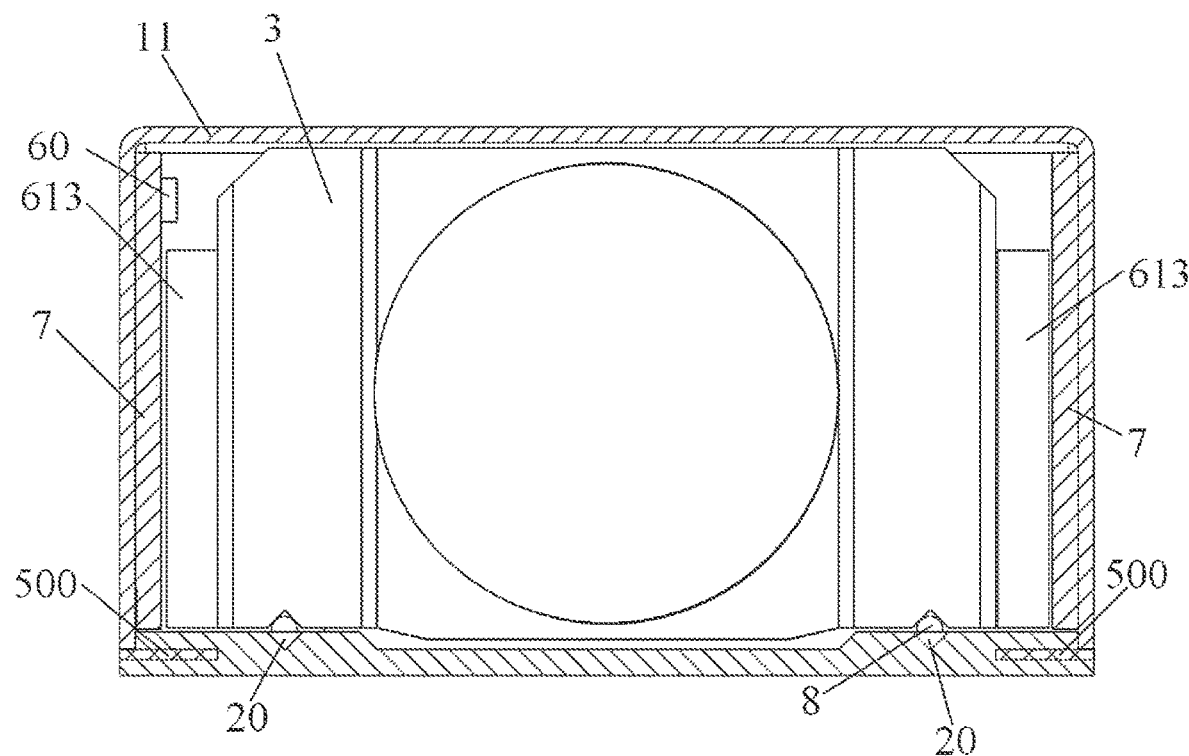
FIG. 10 is a cross-sectional view taken along a line C-C shown in FIG. 8 according to an embodiment of the present disclosure.

Optionally, referring to FIG. 2, FIG. 7 and FIG. 10, the voice coil motor further includes a coil mounting plate 7 fixed on the housing assembly 1 or the base assembly 2, and both the first coil 42 and the second coil 62 are disposed on the coil mounting plate 7. Optionally, the voice coil motor may include two coil mounting plates 7, and the two coil mounting plates 7 are disposed on the left and right sides of the zoom lens holder 3 (or the focusing lens holder 5) respectively, so as to be able to fix the first coils 42 and the second coils 62 disposed on the left and right sides of the zoom lens holder 3.

Furthermore, both the first coil 42 and the second coil 62 may be a flexible printed circuit board (FPCB) coil, and the first coil 42, the second coil 62 and the coil mounting plate 7 can be formed in a single manufacturing process (such as formed by simultaneous pressing). Specifically, the first coil 42 and the second coil 62 can be embedded inside the coil mounting plate 7. A material of the coil mounting plate 7 may be an insulating material.

Figure 4:
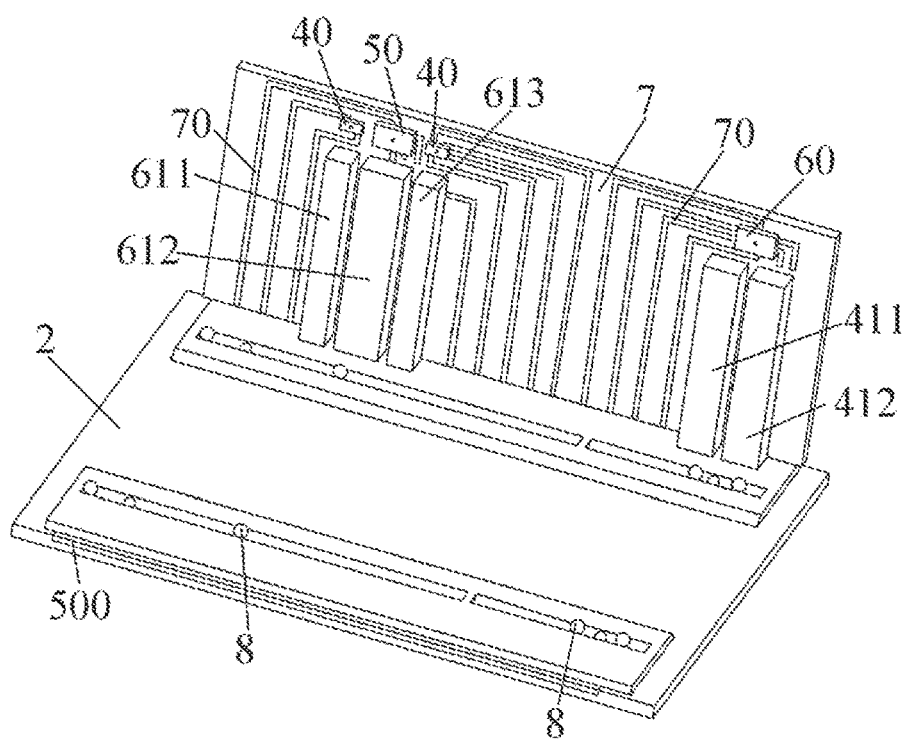
FIG. 4 is a structure view two of the partial voice coil motor according to the embodiment of the present disclosure.

Optionally, as shown in FIG. 4, the voice coil motor further includes a first integrated circuit (IC) unit 60, a second IC unit 50 and two hall sensors 40 disposed on the coil mounting plate 7. The first IC unit 60 is disposed corresponding to the first magnetic steel portion 41 (or the first coil 42), the second IC unit 50 is disposed corresponding to the second magnetic steel portion 61 (or the second coil 62), and the two hall sensors 40 are disposed on front and back sides of the second IC unit 50 respectively.

The hall sensor 40 has a function of detecting a magnetic field. When the hall sensor 40 detects a change in a magnetic field in the vicinity of the second magnetic steel portion 61, the hall sensor 40 can feedback the change to the second IC unit 50, and the second IC unit 50 control a magnitude of a current of the second coil 62. Since a stroke of the focusing lens holder 5 is longer, two hall sensors 40 are disposed in the vicinity of the second magnetic steel portion 61 to accurately detect the magnetic field. The first IC unit 60 and the second IC unit 50 have both a magnetic field detection function and a control function, that is, the first IC unit 60 can detect a change in the magnetic field in the vicinity of the first magnetic steel portion 41 and control the current of the first coil 42. Since a stroke of the zoom lens holder 3 is shorter, in this embodiment, only one first IC unit 60 is disposed in the vicinity of the first magnetic steel portion 41, so that a pin position can be reduced and a circuit can be simplified.

Furthermore, as shown in FIG. 4, the coil mounting plate 7 is provided with a plurality of conductive lines 70, and the plurality of conductive lines 70 are located on a surface of the coil mounting plate 7 or embedded inside the coil mounting plate 7. In addition, the conductive lines 70 are used to supply electric power to the first coil 42, the second coil 62, the first IC unit 60, the second IC unit 50 and the hall sensor 40. Exemplarily, one end of the conductive line 70 is electrically connected to the base assembly 2, and the other end of the conductive line 70 is electrically connected to the first coil 42, the second coil 62, the first IC unit 60, the second IC unit 50 or the hall sensor 40.

Figure 5:
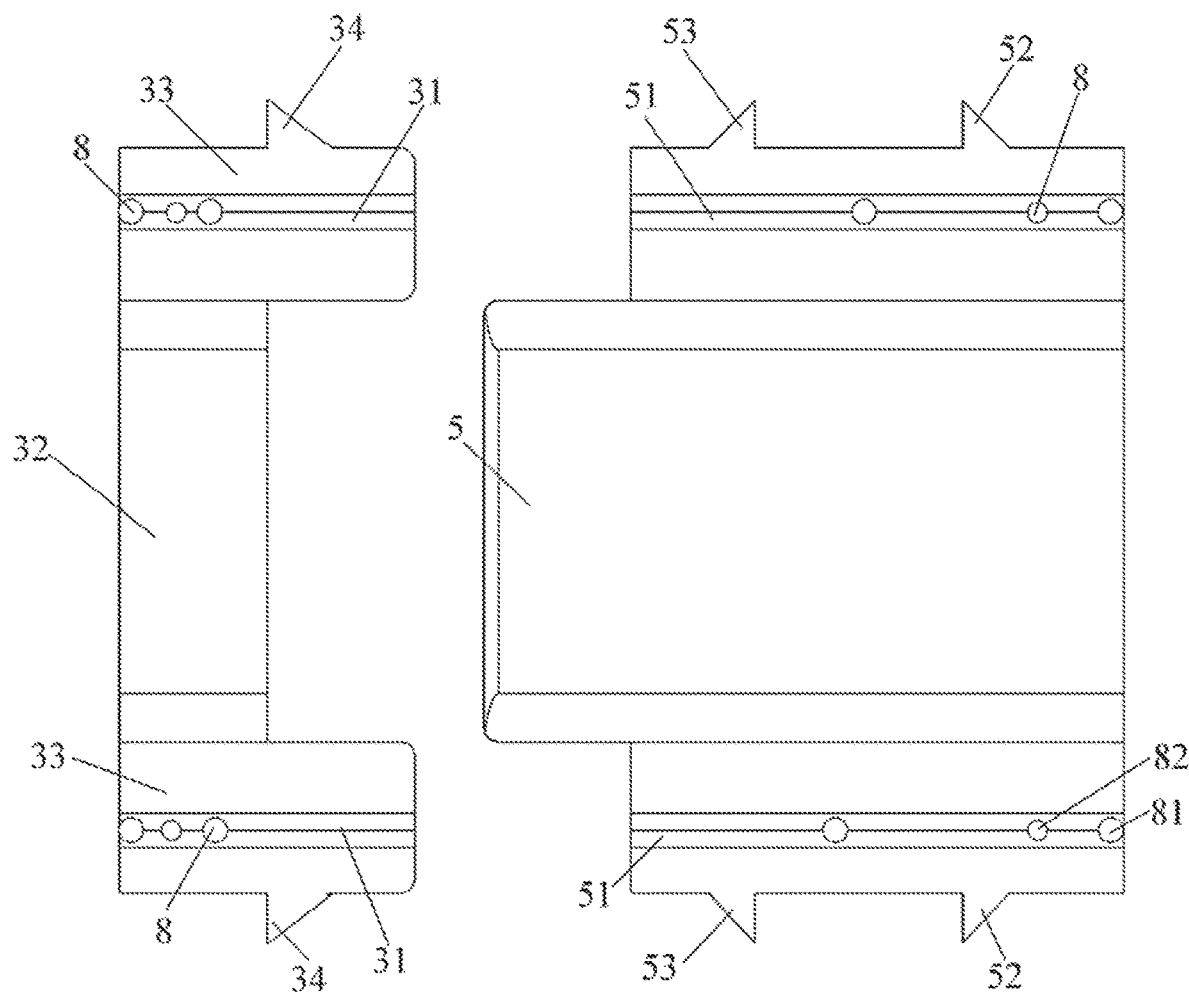
FIG. 5 is an assembly schematic view of a zoom lens holder and a focusing lens holder according to an embodiment of the present disclosure.
Figure 6:
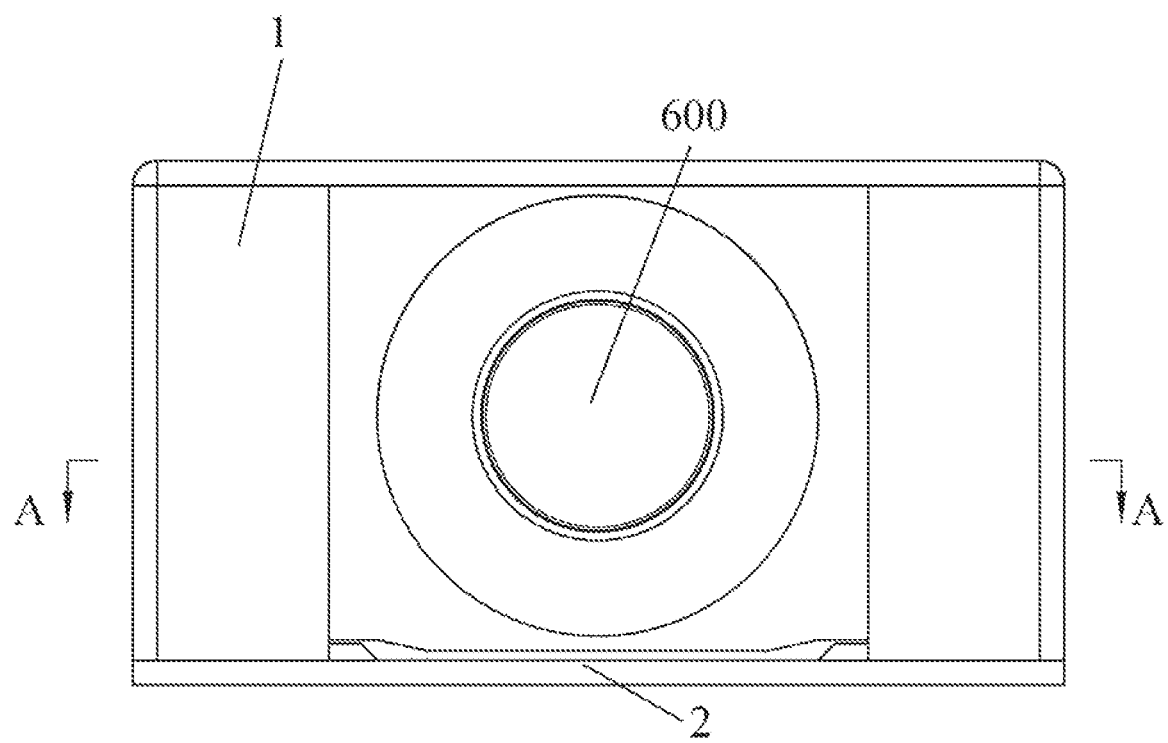
FIG. 6 is a front view of a voice coil motor according to an embodiment of the present disclosure.

Optionally, in order to facilitate the driving of the zoom lens holder 3 and the focusing lens holder 5, referring to FIG. 2 and FIG. 4, the voice coil motor further includes a plurality of rolling assemblies 8, where the voice coil motor comprises at least one of following structures: the zoom lens holder 3 is provided with a first groove 31 extending in the front-back direction (as shown in FIG. 5), one of the base assembly 2 or the housing assembly 1 is provided with a second groove 10 corresponding to the first groove 31, one of the plurality of rolling assemblies 8 is rollably disposed in a space formed by the first groove 31 and the second groove 10, and by the one of the plurality of rolling assemblies 8, the zoom lens holder 3 is moved along the front-back direction relative to the one of the base assembly 2 or the housing assembly 1; or the focusing lens holder 5 is provided with a third groove 51 (as shown in FIG. 5) extending in the front-back direction, one of the base assembly 2 or the housing assembly 1 is provided with a fourth groove 20 corresponding to the third groove 51, another one of the plurality of rolling assemblies 8 is rollably disposed in a space formed by the third groove 51 and the fourth groove 20, and by the another one of the plurality of rolling assemblies 8, the focusing lens holder 5 is moved along the front-back direction relative to the one of the base assembly 2 or the housing assembly 1. In this embodiment, a configuration that the base assembly 2 is provided with the second groove 10 and the fourth groove 20 is described as an example. Optionally, the rolling assembly 8 may be coated with lubricating oil to assist in more stable movement of the zoom lens holder 3 and the focusing lens holder 5.

Since the stroke of the focusing lens holder 5 is longer than the stroke of the zoom lens holder 3, as shown in FIG. 4, a length of the fourth groove 20 on the base assembly 2 is larger than a length of the second groove 10. In addition, the zoom lens holder 3 may be provided with two first grooves 31, and correspondingly, the base assembly 2 may be provided with two second grooves 10. Similarly, the focusing lens holder 5 may be provided with two third grooves 51, and correspondingly, the base assembly 2 may be provided with two fourth grooves 20. In this way, the voice coil motor may include four groups of rolling assemblies 8.

Figure 9:
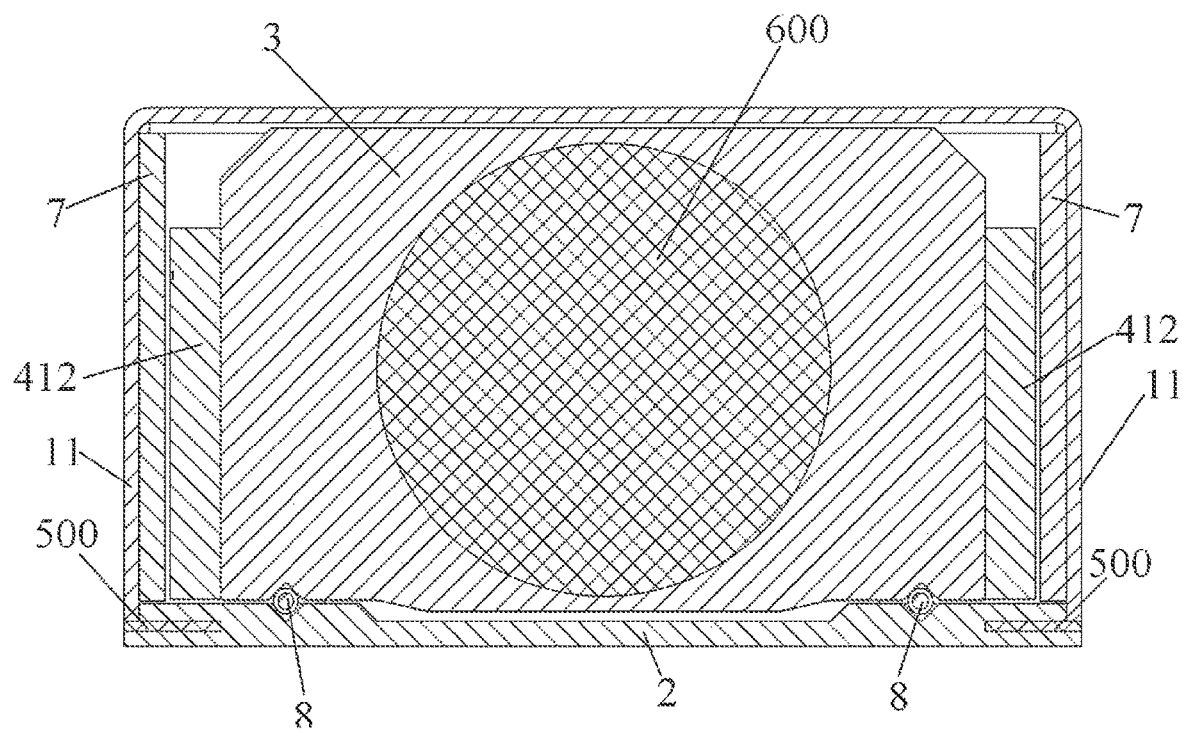
FIG. 9 is a cross-sectional view taken along a line B-B shown in FIG. 8 according to an embodiment of the present disclosure.
Figure 11:
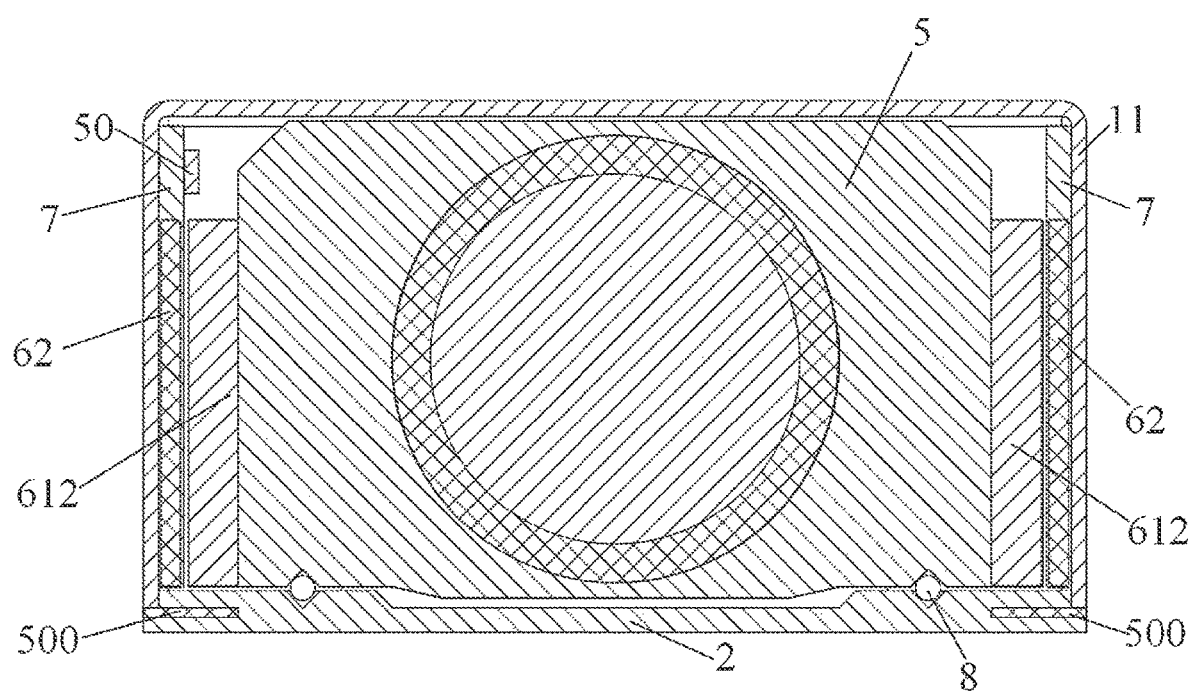
FIG. 11 is a cross-sectional view taken along a line D-D shown in FIG. 8 according to an embodiment of the present disclosure.
Figure 12:
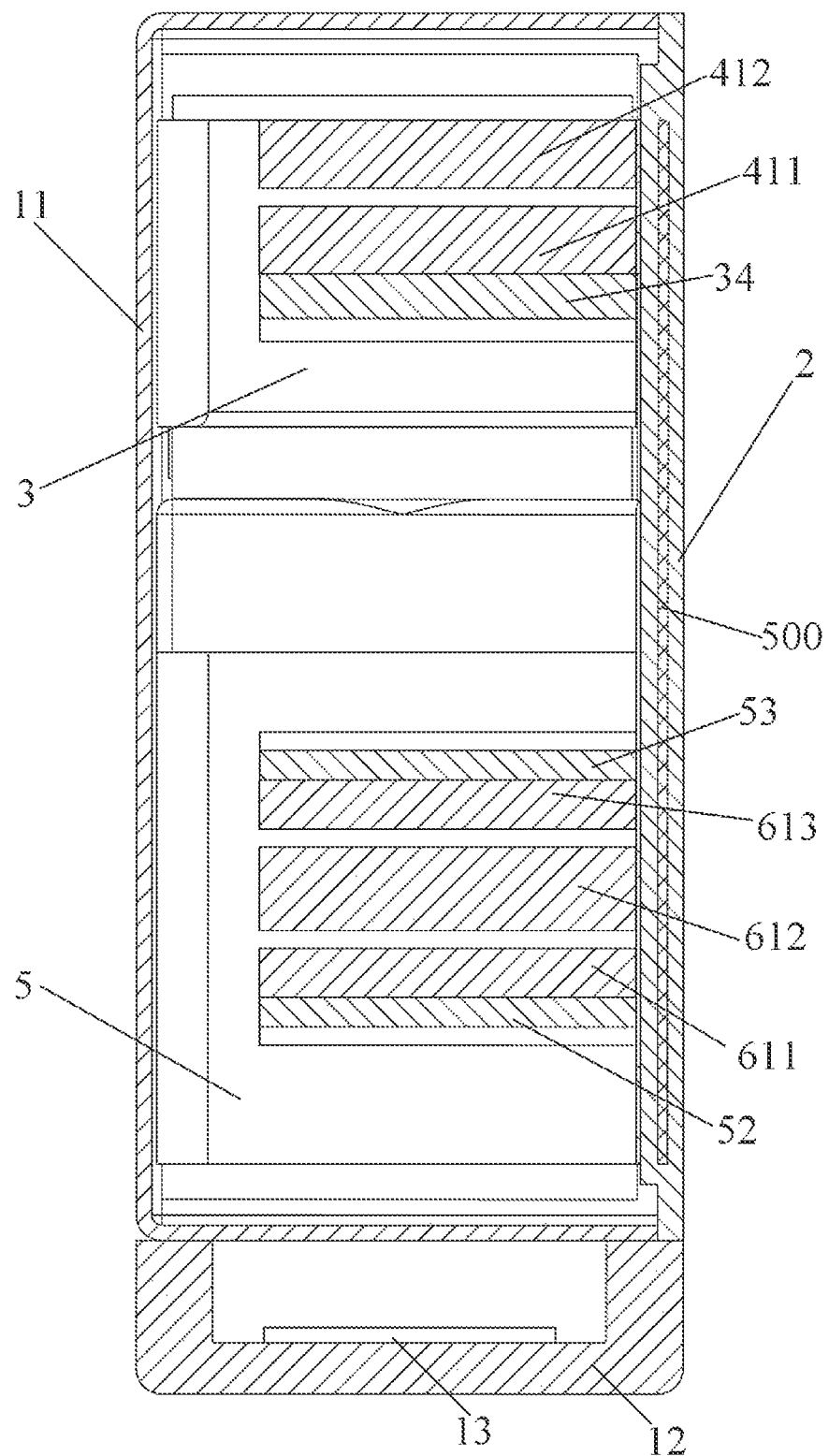
FIG. 12 is a cross-sectional view taken along a line E-E shown in FIG. 8 according to an embodiment of the present disclosure.

Furthermore, the first groove 31 is disposed on a bottom side of the zoom lens holder 3, the third groove 51 is disposed on a bottom side of the focusing lens holder 5, the second groove 10 and the fourth groove 20 are both disposed on an upper side of the base assembly 2, and as shown in FIG. 9 and FIG. 11, the first groove 31, the second groove 10, the third groove 51 and the fourth groove 20 are configured as a V-shaped groove, that is, cross sections of all the first groove 31, the second groove 10, the third groove 51 and the fourth groove 20 are V-shaped. Optionally, the first groove 31, the second groove 10, the third groove 51 and the fourth groove 20 may further be configured as a U-shaped groove, a square groove, an arcuate groove or the like, which is not limited in this embodiment.

Furthermore, each rolling assembly 8 may include two first balls 81 and one second ball 82 disposed between the two first balls 81, and a volume of the second ball 82 is smaller than a volume of the first ball 81. Since the volume of the first ball 81 is different from the volume of the second ball 82, rolling directions of the first ball 81 and the second ball 82 when rolling are opposite, thereby preventing the two first balls 81 from being huddled together, preventing the occurrence of ball pinch, and ensuring that the zoom lens holder 3 and the focusing lens holder 5 can be smoothly driven.

Optionally, as shown in FIG. 5, the zoom lens holder 3 includes a first portion 32 and two second portions 33 disposed at two ends of the first portion 32 respectively. A length of each second portion 33 in the front-back direction is greater than a length of the first portion 32 in the front-back direction, the first groove 31 is disposed on the second portion 33, and specifically, the first groove 31 is disposed on the bottom side of the second portion 33. With this arrangement, a length of the first groove 31 can be longer, so that the zoom lens holder 3 can be more stable during driving, thereby preventing the zoom lens 600 from shaking.

Furthermore, still referring to FIG. 5, a surface of the zoom lens holder 3 facing towards the focusing lens holder 5 has a concave shape, and a surface of the focusing lens holder 5 facing towards the zoom lens holder 3 has a convex shape matched with the concave shape of the zoom lens holder 3. Such concave-convex fit of the focusing lens holder 5 and the zoom lens holder 3 enables maximized movement strokes of the zoom lens 600 and the focusing lens 700 so that ranges of zooming adjustment and focusing adjustment of the voice coil motor provided by this embodiment can be larger.

Furthermore, referring to FIG. 5 and FIG. 7, the left and right sides of the zoom lens holder 3 are each provided with a first stop portion 34 for limiting a position of the first magnetic steel portion 41 so as to prevent the first magnetic steel portion 41 from moving relative to the zoom lens holder 3. The left and right sides of the focusing lens holder 5 are each provided with a second stop portion 52 and a third stop portion 53 spaced apart from the second stop portion 52. The second magnetic steel portion 61 is disposed between the second stop portion 52 and the third stop portion 53 to limit a position of the second magnetic steel portion 61 and prevent the second magnetic steel portion 61 from moving.

Optionally, as shown in FIG. 9 to FIG. 11, the voice coil motor further includes a metal adsorption member 500 embedded in the base assembly 2, where the adsorption member 500 extends in the front-back direction, and the adsorption member 500 and at least one of the first magnetic steel portion 41 in the first electromagnetic drive assembly 4 or the second magnetic steel portion 61 in the second electromagnetic drive assembly 6 have a magnetic attraction force with each other. When there is a magnetic attraction force between the adsorption member 500 and the first magnetic steel portion 41, since the first magnetic steel portion 41 is fixed to the zoom lens holder 3, the zoom lens holder 3 can be subjected to an adsorption force toward the base assembly 2, so that the zoom lens holder 3 can be tightly attached to the rolling assembly 8, and when the voice coil motor is installed in a mobile phone or a movable device, the zoom lens holder 3 can be kept tightly attached to the rolling assembly 8 on the base assembly 2 without loosening when the mobile phone or the movable device is in any one of a direction toward the sky, a direction toward the floor, and a direction toward the horizontal. Similarly, when there is a magnetic attraction force between the adsorption member 500 and the second magnetic steel portion 61, the focusing lens holder 5 can be subjected to an adsorption force toward the base assembly 2, thereby enabling that the focusing lens holder 5 can be tightly attached to the rolling assembly 8, and thereby achieving a corresponding effect.

Furthermore, as shown in FIG. 2, the housing assembly 1 may include a housing 11, a rear housing 12 fixedly connected to a rear side of the housing 11 and a complementary metal-oxide-semiconductor transistor (CMOS) image sensor 13 disposed in the rear housing 12. The adsorption member 500 is disposed so that the zoom lens 600 and the focusing lens 700 can be constantly perpendicular to the CMOS image sensor 13 in any posture, thus ensuring an accuracy of the CMOS image sensor 13 in acquiring images of the zoom lens 600 and the focusing lens 700.

Optionally, referring to FIG. 9, the adsorption member 500, the housing 11 and the base assembly 2 are sealed and welded all around to ensure sealing performance of the voice coil motor.

Figure 13:
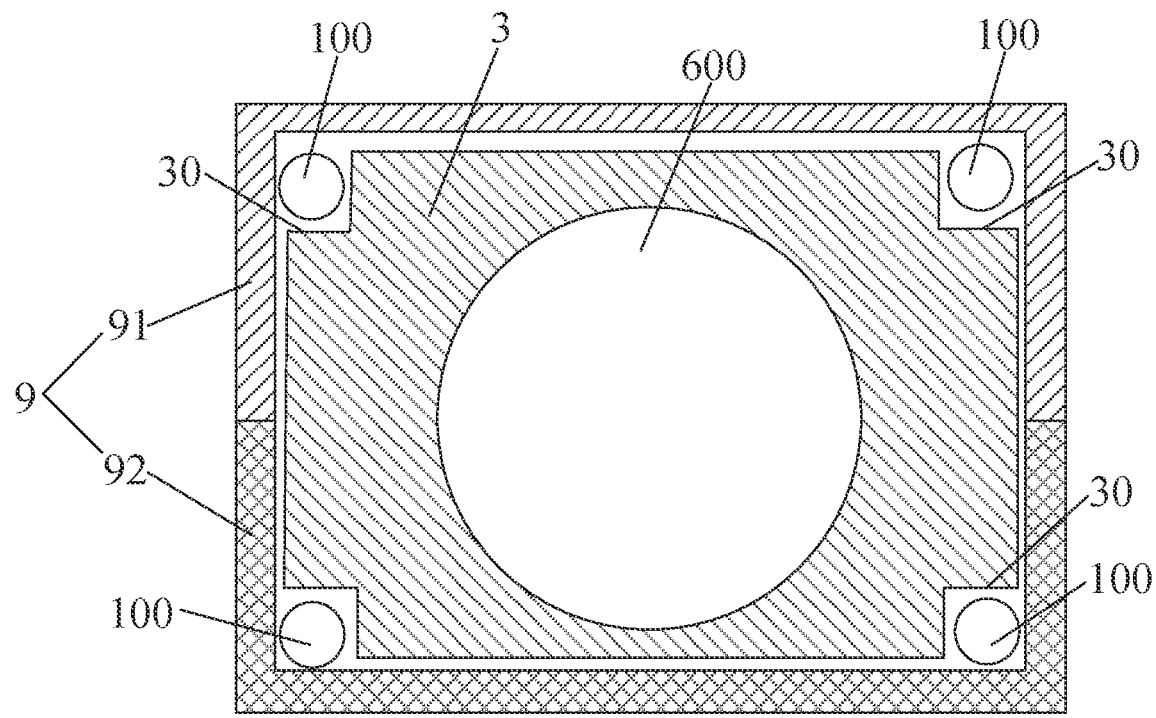
FIG. 13 is a cross-sectional view one of a voice coil motor according to an embodiment of the present disclosure.
Figure 14:
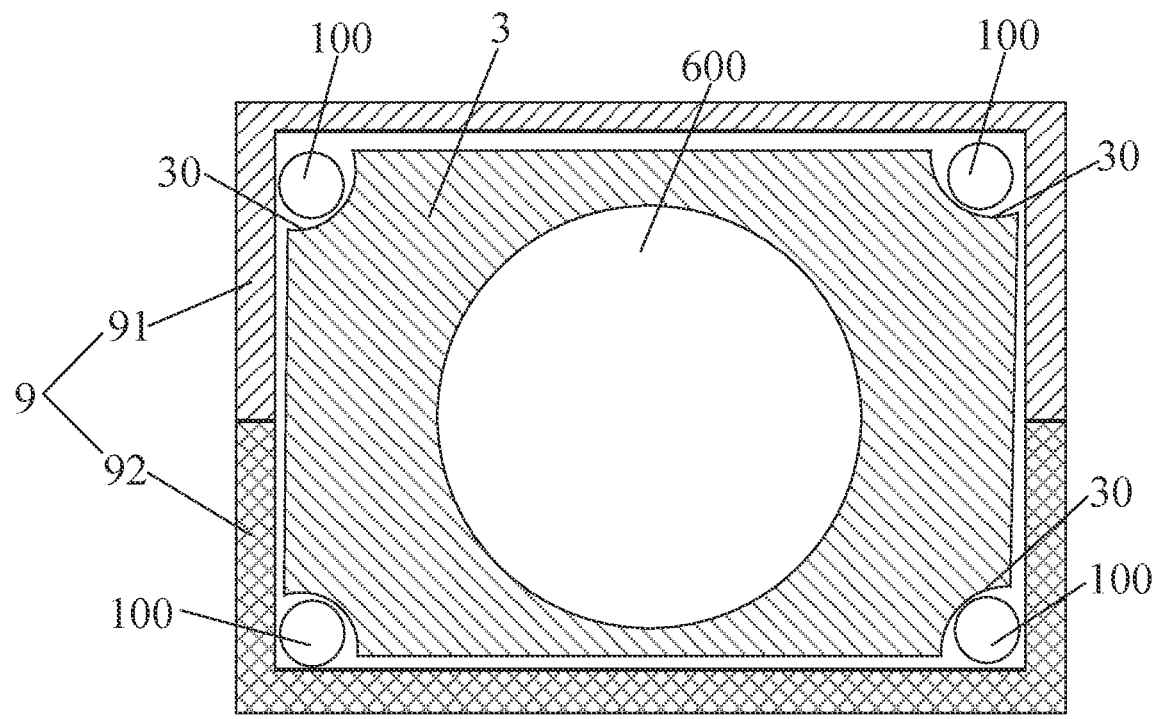
FIG. 14 is a cross-sectional view two of a voice coil motor according to an embodiment of the present disclosure.

Optionally, as shown in FIG. 13 and FIG. 14, the voice coil motor may further include a support frame 9 and a third ball 100. The support frame 9 is sleeved outside the zoom lens holder 3 and the focusing lens holder 5, and is mounted on the housing assembly 1 and the base assembly 2. Corner positions of at least one of the zoom lens holder 3 or the focusing lens holder 5 are provided with grooves 30, and the third ball 100 is rollably disposed between a respective groove 30 and the support frame 9, that is, the third ball 100 is disposed at each of four corners of the zoom lens holder 3 or the focusing lens holder 5. With this arrangement, the zoom lens holder 3 and the focusing lens holder 5 can be moved relative to the support frame 9 through the rolling third balls 100.

Furthermore, the groove 30 may be an L-shaped groove (as shown in FIG. 13), or the groove 30 may further be an arc-shaped groove (as shown in FIG. 14). Moreover, a material of the support frame 9 may be a composite material such as plastic or a metal material.

In addition, in order to make tracks formed by four corners inside the support frame 9 parallel to each other, as shown in FIG. 13 and FIG. 14, the support frame 9 may include a first frame 91 and a second frame 92, and the first frame 91 and the second frame 92 are welded or connected in a laser welding mode to form the support frame 9. Since two tracks inside the first frame 91 (or the second frame 92) are more easily parallel to each other during a manufacturing process, it is convenient for the tracks formed by the four corners inside the support frame 9 to be parallel to each other.

Figure 15:
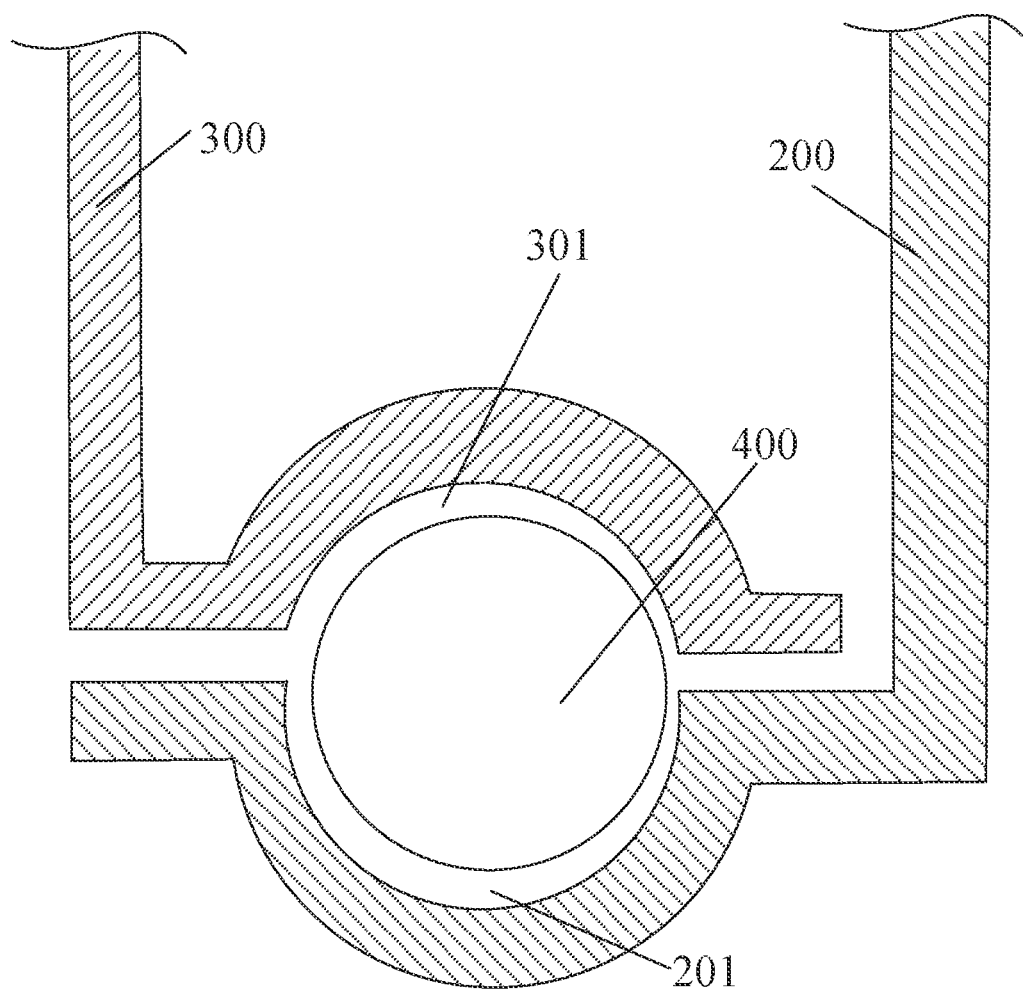
FIG. 15 is a cross-sectional view of a first ball holding mechanism, a second ball holding mechanism, and a fourth ball according to an embodiment of the present disclosure.

Optionally, as shown in FIG. 15, the voice coil motor further includes a first ball holding mechanism 200, a second ball holding mechanism 300 and a fourth ball 400. One end of the first ball holding mechanism 200 is connected to the housing assembly 1 or the base assembly 2, and the other end of the first ball holding mechanism 200 has a first arc groove 201. One end of the second ball holding mechanism 300 is connected to at least one of the zoom lens holder 3 or the focusing lens holder 5, and the other end of the second ball holding mechanism 300 has a second arc groove 301. The fourth ball 400 is rollably disposed in a space formed by the first arc groove 201 and the second arc groove 301. In this way, the zoom lens holder 3 and the focusing lens holder 5 are moved relative to the base assembly 2 by the rolling fourth ball 400.

The above embodiments describe only the basic principles and characteristics of the present disclosure and the present disclosure is not limited to the above embodiments. Various modifications and changes may be made in the present disclosure without departing from the spirit and scope of the present disclosure. These modifications and changes fall within the scope of the present disclosure. The scope of the present disclosure is defined by the appended claims and equivalents thereof.

What is claimed is:

1. A voice coil motor, comprising:
a housing assembly;
a base assembly, which forms an accommodation space with the housing assembly;
a zoom lens holder disposed in the accommodation space;
a first electromagnetic drive assembly, which comprises a first magnetic steel portion and a first coil disposed opposite to the first magnetic steel portion, wherein one of the first magnetic steel portion or the first coil is located on the housing assembly or the base assembly, and the other one of the first magnetic steel portion or the first coil is located on the zoom lens holder;
a focusing lens holder, wherein the focusing lens holder and the zoom lens holder are disposed in the accommodation space in a front-back direction; and
a second electromagnetic drive assembly, which comprises a second magnetic steel portion and a second coil disposed opposite to the second magnetic steel portion, wherein one of the second magnetic steel portion or the second coil is located on the housing assembly or the base assembly, and the other one of the second magnetic steel portion or the second coil is located on the focusing lens holder;
wherein the first electromagnetic drive assembly and the second electromagnetic drive assembly are independent of each other, the first electromagnetic drive assembly is configured to drive the zoom lens holder to move along the front-back direction, and the second electromagnetic drive assembly is configured to drive the focusing lens holder to move along the front-back direction, and
wherein each of the first magnetic steel portion and the second magnetic steel portion has an N pole and an S pole, the N pole and the S pole of the first magnetic steel portion are alternate in the front-back direction, and the N pole and the S pole of the second magnetic steel portion are alternate in the front-back direction.

2. The voice coil motor of claim 1, further comprising a coil mounting plate, wherein the coil mounting plate is fixed on one of the housing assembly or the base assembly, and both the first coil and the second coil are disposed on the coil mounting plate.

3. The voice coil motor of claim 1, further comprising a plurality of rolling assemblies; wherein the voice coil motor comprises at least one of following structures:
the zoom lens holder is provided with a first groove, one of the base assembly or the housing assembly is provided with a second groove corresponding to the first groove, one of the plurality of rolling assemblies is rollably disposed in a space formed by the first groove and the second groove, and by the one of the plurality of rolling assemblies, the zoom lens holder is moved along the front-back direction relative to the one of the base assembly or the housing assembly; or
the focusing lens holder is provided with a third groove, one of the base assembly or the housing assembly is provided with a fourth groove corresponding to the third groove, another one of the plurality of rolling assemblies is rollably disposed in a space formed by the third groove and the fourth groove, and by the another one of the plurality of rolling assemblies, the focusing lens holder is moved along the front-back direction relative to the one of the base assembly or the housing assembly.

4. The voice coil motor of claim 3, wherein the first groove is disposed on a bottom side of the zoom lens holder, the third groove is disposed on a bottom side of the focusing lens holder, the second groove and the fourth groove are disposed on the base assembly, and the first groove, the second groove, the third groove and the fourth groove are configured as one of a V-shaped groove or a U-shaped groove.

5. The voice coil motor of claim 4, wherein each of the plurality of rolling assemblies comprises two first balls and one second ball disposed between the two first balls, and a volume of the one second ball is smaller than a volume of each of the two first balls.

6. The voice coil motor of claim 4, wherein the zoom lens holder comprises a first portion and two second portions disposed at two ends of the first portion, a length of each of the two second portions in the front-back direction is greater than a length of the first portion in the front-back direction, and the first groove is disposed at each of the two second portions.

7. The voice coil motor of claim 1, further comprising an adsorption member embedded in the base assembly, wherein the adsorption member and at least one of the first electromagnetic drive assembly or the second electromagnetic drive assembly have a magnetic attraction force with each other.

8. The voice coil motor of claim 1, further comprising a support frame and third balls, wherein the support frame is sleeved outside the zoom lens holder and the focusing lens holder, corner positions of at least one of the zoom lens holder or the focusing lens holder are provided with grooves, and each of the third balls is rollably disposed between a respective groove and the support frame.

9. The voice coil motor of claim 1, further comprising a first ball holding mechanism, a second ball holding mechanism and a fourth ball, wherein an end of the first ball holding mechanism is connected to one of the housing assembly or the base assembly, and the other end of the first ball holding mechanism has a first arc groove; an end of the second ball holding mechanism is connected to at least one of the zoom lens holder or the focusing lens holder, and the other end of the second ball holding mechanism has a second arc groove; and the fourth ball is rollably disposed in a space formed by the first arc groove and the second arc groove.

10. A voice coil motor, comprising:
a housing assembly;
a base assembly, which forms an accommodation space with the housing assembly;
a zoom lens holder disposed in the accommodation space;
a first electromagnetic drive assembly, which comprises a first magnetic steel portion and a first coil disposed opposite to the first magnetic steel portion, wherein one of the first magnetic steel portion or the first coil is located on the housing assembly or the base assembly, and the other one of the first magnetic steel portion or the first coil is located on the zoom lens holder;
a focusing lens holder, wherein the focusing lens holder and the zoom lens holder are disposed in the accommodation space in a front-back direction;
a second electromagnetic drive assembly, which comprises a second magnetic steel portion and a second coil disposed opposite to the second magnetic steel portion, wherein one of the second magnetic steel portion or the second coil is located on the housing assembly or the base assembly, and the other one of the second magnetic steel portion or the second coil is located on the focusing lens holder; wherein the first electromagnetic drive assembly and the second electromagnetic drive assembly are independent of each other, the first electromagnetic drive assembly is configured to drive the zoom lens holder to move along the front-back direction, and the second electromagnetic drive assembly is configured to drive the focusing lens holder to move along the front-back direction; and
a plurality of rolling assemblies, wherein the voice coil motor comprises at least one of following structures:
the zoom lens holder is provided with a first groove, one of the base assembly or the housing assembly is provided with a second groove corresponding to the first groove, one of the plurality of rolling assemblies is rollably disposed in a space formed by the first groove and the second groove, and by the one of the plurality of rolling assemblies, the zoom lens holder is moved along the front-back direction relative to the one of the base assembly or the housing assembly; or
the focusing lens holder is provided with a third groove, one of the base assembly or the housing assembly is provided with a fourth groove corresponding to the third groove, another one of the plurality of rolling assemblies is rollably disposed in a space formed by the third groove and the fourth groove, and by the another one of the plurality of rolling assemblies, the focusing lens holder is moved along the front-back direction relative to the one of the base assembly or the housing assembly.

11. The voice coil motor of claim 10, further comprising a coil mounting plate, wherein the coil mounting plate is fixed on one of the housing assembly or the base assembly, and both the first coil and the second coil are disposed on the coil mounting plate.

12. The voice coil motor of claim 10, wherein the first groove is disposed on a bottom side of the zoom lens holder, the third groove is disposed on a bottom side of the focusing lens holder, the second groove and the fourth groove are disposed on the base assembly, and the first groove, the second groove, the third groove and the fourth groove are configured as one of a V-shaped groove or a U-shaped groove.

13. The voice coil motor of claim 12, wherein each of the plurality of rolling assemblies comprises two first balls and one second ball disposed between the two first balls, and a volume of the one second ball is smaller than a volume of each of the two first balls.

14. The voice coil motor of claim 12, wherein the zoom lens holder comprises a first portion and two second portions disposed at two ends of the first portion, a length of each of the two second portions in the front-back direction is greater than a length of the first portion in the front-back direction, and the first groove is disposed at each of the two second portions.

15. The voice coil motor of claim 10, further comprising an adsorption member embedded in the base assembly, wherein the adsorption member and at least one of the first electromagnetic drive assembly or the second electromagnetic drive assembly have a magnetic attraction force with each other.

16. The voice coil motor of claim 10, further comprising a support frame and third balls, wherein the support frame is sleeved outside the zoom lens holder and the focusing lens holder, corner positions of at least one of the zoom lens holder or the focusing lens holder are provided with grooves, and each of the third balls is rollably disposed between a respective groove and the support frame.

17. The voice coil motor of claim 10, further comprising a first ball holding mechanism, a second ball holding mechanism and a fourth ball, wherein an end of the first ball holding mechanism is connected to one of the housing assembly or the base assembly, and the other end of the first ball holding mechanism has a first arc groove; an end of the second ball holding mechanism is connected to at least one of the zoom lens holder or the focusing lens holder, and the other end of the second ball holding mechanism has a second arc groove; and the fourth ball is rollably disposed in a space formed by the first arc groove and the second arc groove.

18. A voice coil motor, comprising:
a housing assembly;
a base assembly, which forms an accommodation space with the housing assembly;
a zoom lens holder disposed in the accommodation space;
a first electromagnetic drive assembly, which comprises a first magnetic steel portion and a first coil disposed opposite to the first magnetic steel portion, wherein one of the first magnetic steel portion or the first coil is located on the housing assembly or the base assembly, and the other one of the first magnetic steel portion or the first coil is located on the zoom lens holder;

a focusing lens holder, wherein the focusing lens holder and the zoom lens holder are disposed in the accommodation space in a front-back direction;

a second electromagnetic drive assembly, which comprises a second magnetic steel portion and a second coil disposed opposite to the second magnetic steel portion, wherein one of the second magnetic steel portion or the second coil is located on the housing assembly or the base assembly, and the other one of the second magnetic steel portion or the second coil is located on the focusing lens holder; wherein the first electromagnetic drive assembly and the second electromagnetic drive assembly are independent of each other, the first electromagnetic drive assembly is configured to drive the zoom lens holder to move along the front-back direction, and the second electromagnetic drive assembly is configured to drive the focusing lens holder to move along the front-back direction; and an adsorption member embedded in the base assembly, wherein the adsorption member and at least one of the first electromagnetic drive assembly or the second electromagnetic drive assembly have a magnetic attraction force with each other.

19. The voice coil motor of claim 18, further comprising a coil mounting plate, wherein the coil mounting plate is fixed on one of the housing assembly or the base assembly, and both the first coil and the second coil are disposed on the coil mounting plate.

20. The voice coil motor of claim 18, wherein the first groove is disposed on a bottom side of the zoom lens holder, the third groove is disposed on a bottom side of the focusing lens holder, the second groove and the fourth groove are disposed on the base assembly, and the first groove, the second groove, the third groove and the fourth groove are configured as one of a V-shaped groove or a U-shaped groove.

* * * * *